United States Patent [19]

Karim

[11] Patent Number: 4,659,596
[45] Date of Patent: Apr. 21, 1987

[54] SMOOTH-LOOK FOOTWEAR PROCESS

[75] Inventor: Karl A. Karim, Houston, Tex.

[73] Assignee: Shell Oil Company, Houston, Tex.

[21] Appl. No.: 797,056

[22] Filed: Nov. 12, 1985

Related U.S. Application Data

[63] Continuation-in-part of Ser. No. 603,058, Apr. 23, 1984, abandoned.

[51] Int. Cl.$^4$ .............................................. B05D 3/02
[52] U.S. Cl. ............................... 427/393.5; 36/30 R; 36/32 R
[58] Field of Search ........................... 427/385.5, 393.5

[56] References Cited

U.S. PATENT DOCUMENTS

| | | | |
|---|---|---|---|
| Re. 28,236 | 11/1974 | Hendricks et al. | 36/2.5 R |
| 2,717,214 | 9/1955 | Marotta et al. | 106/192 X |
| 2,870,035 | 1/1959 | Allen | 106/192 |
| 3,904,801 | 9/1975 | Harlan, Jr. | 428/519 X |
| 4,092,279 | 5/1978 | Piskoti | 427/393.5 X |
| 4,217,395 | 8/1980 | Kuan et al. | 427/393.5 X |

*Primary Examiner*—Thurman K. Page
*Attorney, Agent, or Firm*—Peter A. Bielinski

[57] ABSTRACT

The present invention relates to a process for dulling molded block copolymer compositions comprising coating the surface of a molded block copolymer rubber composition with a dulling solution comprising a polymeric binder which is compatible with the molded block copolymer rubber composition, a matting agent and a suitable solvent and evaporating the solvent.

15 Claims, No Drawings

SMOOTH-LOOK FOOTWEAR PROCESS

This application is a continuation-in-part of application Ser. No. 603,058, filed Apr. 23, 1984 now abandoned.

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. Re. 28,236. In general, these shoe component compositions usually comprise a mixture of block copolymer, extending oil, polystyrene and possibly a filler. For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe areas of footwear, one of the major shortcomings of the block copolymer compounds such as those referred to in U.S. Pat. No. Re. 28,236 is the lack of a smooth appearance. Present block copolymer compounds lack the smooth, relatively unblemished surface which is characteristic of compression molded vulcanized conventional rubber, injection molded poly(vinyl chloride) or leather. A new process has now been found that produces a smooth dull surface and also is non-delaminating.

SUMMARY OF THE INVENTION

The present invention relates to a process for dulling molded block copolymer compositions comprising coating the surface of a molded block copolymer rubber composition with a dulling solution comprising a polymeric binder which is compatible with the molded block copolymer rubber composition, a matting agent and a suitable solvent and evaporating the solvent.

In order to dull the shiny surface of articles made of molded block copolymer rubber composition a dulling or matting solution was developed. This solution will leave small imperfections on the surface of the composition to scatter the incident light. These imperfections are too small to be seen by the naked eye but large enough to resolve light of different wave lengths. The matting solution contains a rubber or copolymers thereof as a binder, a suitable hydrocarbon filler solvent and an inert filler as a matting agent. The particle size of the filler is chosen to be greater than half the wave length of visible light but smaller than 25 microns. Particles over 25 microns in size are visible to the naked eye and appear as lumps on the surface. The process of dulling involves dipping the molded article for a very short time in the matting solution followed immediately by drying. Other methods of treatment such as brushing or spraying may be used. The mechanism of dulling may be explained as follows: When the wet film of the matting solution is applied to the article, the filler particles are distributed on the surface together with the binding resin. As the solvent evaporates the thickness of the film decreases, trapping the filler particles and binding them to the surface. In addition to dulling the surface of block copolymer compositions, the above process may be used to eliminate the unsightly splashes or frostings on the surface of molded articles. Presently, the industry is using a "cleaning solution" based on methyl ethylketone. This solution is relatively expensive and far inferior to the present matting solution.

DETAILED DESCRIPTION OF THE INVENTION

The polymeric binder can be any polymeric composition which when applied in solution to the surface of the molded block copolymer composition will bind to the surface and will also effectively bind a finely divided filler which may be present in the solution.

For styrene-butadiene based molded compositions a butadiene rubber or a styrene-butadiene block copolymer may be used as the binder The matting agent or filler may be any finely divided fibrous or particulate material which is substantially unsoluble in the dulling solution and which contains fibers or particles in the range of from about 1 micron to about 25 microns.

The fillers used in the present compositions are well known in the art and include clay, talc, silica, titanium dioxide, carbon blacks, calcium carbonate, and other pigments as well as fibrous fillers such as cellulosic fibers, sawdust, ground cork, etc. Preferred fillers include silica and calcium carbonate. The amount of filler employed can vary widely with the degree of dulling desired. The amount may vary from as low as 1% by weight based on the weight of the binder to 500% by weight. Higher concentrations may produce agglomeration on the surface or delaminating. Additional minor amounts of antioxidants, ultra-violet stabilizers and the like may also be added.

A typical matting solution may have 7% by weight binder, 1% silica and 92% solvent.

The solvent may be any solvent capable of dissolving the binder which has a reasonably high vapor pressure to avoid unreasonably long drying times. Preferred solvents are hydrocarbon or chlorinated hydrocarbon solvents for example methylcyclohexane, cyclohexane, ethyl benzene, toluene, tetrahydrofuran, carbon tetrachloride and carbon disulfide.

The matting solution may be coated or applied to the surface of the molded composition by any convenient means. These means may include dipping, spraying or brushing. The solution should be applied in a uniform coat so as to obtain uniform dulling. The amount of solvent may be varied so as to optimize for a particular method with spraying typically requiring somewhat more diluent or solvent than dipping or brushing.

It has been found that high concentrations of silica particles in the dulling solution results in agglomeration of the particles and produces an unacceptable roughness in the final dull coating. In addition, a high concentration of silica in the coating adversely affects the adhesion of the shoe uppers to the soles. Therefore, a concentration of less than about 1.0 wt% was found to be necessary to achieve consistent smooth dull coatings.

However, it has also been found that the dulling solutions form stable suspensions with silica concentrations of about 2% or more. Below 2% the suspension is unstable and will settle in a matter of seconds. These solutions must be constantly agitated for effective use.

However, if a surfactant is added to the dulling solution such as a non-ionic surfactant, e.g., nonylphenoxy poly[ethyleneoxy]ethanols, Igepal CO-210 or Igepal CO-430 available from GAF, the suspensions are stabilized with silica concentrations below 2% by weight. Concentrations of surfactant above about 2% were found to also adversely affect adhesion of the uppers to the shoe soles.

A typical stabilized dulling solution comprises:
Cyclohexane—98.17 wt%
Rubber—0.58 wt%
Silica—0.75 wt%
Surfactant—0.50 wt%.

Molded articles should be dryed immediately to prevent running or dripping. Drying can be accomplished by any convenient means, e.g., air drying with optional heat.

Illustrative Embodiment #1

A matting solution was prepared by mixing 7 parts of a radial $(A-B)_xB-A$ block copolymer wherein A is polystyrene and B is polybutadiene, x is 2.5 and the molecular weight by GPC of A is 25,000 and B is 36,000, 1 part of silica with particles ranging primarily from about 1.0 to 25 microns in size and 92 parts of cyclohexane. The matting solution as above was applied to a molded styrene-butadiene-styrene block copolymer shoe sole by dipping the shoe sole in the matting solution. After air drying the shoe sole had a smooth, dull finish without visible surface imperfections.

Illustrative Embodiment #2

A matting solution was prepared by mixing 98.17 wt% cyclohexane, 0.58 wt% styrene-butadiene block copolymer available from Shell Chemical Company as Kraton ®4240, 0.75 wt% of the silica in #1 above and 0.5 wt% of Igepal CO-430 surfactant. The solution formed a stable emulsion with no need for agitation. The solution was applied to a shoe sole again by dipping and after drying the sole had a smooth dull surface appearance. Adhesion of the shoe sole to the upper was not adversely affected.

What is claimed is:

1. A process for dulling molded block copolymer compositions comprising coating the surface of a molded block copolymer rubber composition with a matting solution comprising a polymeric binder which is compatible with the molded block copolymer rubber composition, a matting agent, a surfactant and a suitable solvent and evaporating the solvent.

2. The process of claim 1 wherein the molded composition is a styrene-butadiene block copolymer composition.

3. The process of claim 1 wherein the matting agent is a silica filler.

4. The process of claim 1 wherein the matting agent has particles in the range of from about 1 to 20 microns.

5. The process of claim 1 wherein the matting agent is present in the matting solution in amounts between 1 and 500 parts by weight per hundred parts binder.

6. The process of claim 1 wherein the solvent is a hydrocarbon solvent.

7. The process of claim 1 wherein the solvent is a chlorinated hydrocarbon solvent.

8. The process of claim 1 wherein the solvent is cyclohexane.

9. The process of claim 1 wherein the dulling solution is applied by spraying.

10. The process of claim 1 wherein the molded composition is dipped in the matting solution.

11. The process of claim 1 wherein the binder is a butadiene rubber.

12. The process of claim 1 wherein the binder is a styrene-butadiene copolymer.

13. The process of claim 1 wherein the surfactant is present at between 0.05 and 2% by weight.

14. The process of claim 1 wherein the surfactant is a non-ionic surfactant.

15. The process of claim 1 wherein the surfactant is a nonylphenoxy poly(ethyleneoxy)ethanol.

* * * * *